US005634749A

United States Patent [19]

Edis et al.

[11] Patent Number: 5,634,749

[45] Date of Patent: *Jun. 3, 1997

[54] VACUUM VICE FOR BOWLING BALLS

[75] Inventors: David Edis, San Bernardino; Bert Poort, Covina, both of Calif.

[73] Assignee: Jerry Liem, Canyon Lake, Calif.

[ * ] Notice: The portion of the term of this patent subsequent to Aug. 26, 2014, has been disclaimed.

[21] Appl. No.: 327,456

[22] Filed: Oct. 21, 1994

(Under 37 CFR 1.47)

Related U.S. Application Data

[63] Continuation-in-part of Ser. No. 213,884, Mar. 16, 1994, abandoned.

[51] Int. Cl.[6] .............................. B23C 3/00; B23B 35/00; B23B 11/00

[52] U.S. Cl. ............................ 409/131; 269/21; 408/1 R; 409/225

[58] Field of Search .................................... 409/131, 132, 409/225, 163; 408/1 R, DIG. 1, 241 R; 29/560; 51/289.5; 269/21

[56] References Cited

U.S. PATENT DOCUMENTS

| | | | |
|---|---|---|---|
| 2,269,946 | 1/1942 | Lange | 144/93 |
| 2,283,469 | 5/1942 | Shepard | 77/63 |
| 2,398,959 | 4/1946 | Petry | 279/3 |
| 2,428,669 | 10/1947 | Hopkins | 77/63 |
| 2,490,120 | 12/1949 | Ellison et al. | 77/63 |
| 2,508,281 | 5/1950 | Miller et al. | 90/58 |
| 2,879,679 | 3/1959 | Neff | 77/63 |
| 2,910,780 | 11/1959 | Neff | 33/174 |
| 2,973,674 | 3/1961 | Hladik | 77/63 |
| 3,085,476 | 4/1963 | Sloan et al. | 90/12 |
| 3,095,767 | 7/1963 | Jesonis | 77/62 |
| 3,110,226 | 11/1963 | Dionne | 90/62 |
| 3,124,018 | 3/1964 | Gough | 77/63 |
| 3,137,074 | 6/1964 | Jesonis | 33/174 |
| 3,143,901 | 8/1964 | Bawtinheimer | 77/32.2 |
| 3,167,326 | 1/1965 | Heessels | 279/3 |
| 3,179,013 | 4/1965 | Goldsmith | 90/20 |
| 3,262,340 | 7/1966 | Sammons et al. | 77/62 |
| 3,263,531 | 8/1966 | Sammons et al. | 77/62 |
| 3,271,870 | 9/1966 | Blaker et al. | 33/174 |
| 3,304,814 | 2/1967 | Scott | 77/31 |
| 3,329,043 | 7/1967 | Stanford | 77/31 |
| 3,349,647 | 10/1967 | Stan | 77/5 |
| 3,382,740 | 5/1968 | Lotta | 77/5 |
| 3,415,146 | 12/1968 | Schroeder, Jr. | 77/62 |
| 3,460,822 | 1/1985 | Link | 269/21 |
| 3,465,619 | 9/1969 | Blaker et al. | 77/5 |
| 3,484,093 | 12/1969 | Mermelstein | 269/21 |
| 3,521,506 | 7/1970 | Di Nardo | 77/5 |
| 3,689,165 | 9/1972 | Small | 408/3 |
| 3,714,703 | 2/1973 | Maples | 29/560 |
| 3,805,394 | 4/1974 | Marberg | 33/174 |
| 3,838,865 | 10/1974 | Roberts et al. | 279/3 |
| 3,841,780 | 10/1974 | Mengeringhousen | 408/1 |
| 3,843,276 | 10/1974 | Williams | 408/236 |
| 3,955,163 | 5/1976 | Novak | 355/132 |
| 4,186,916 | 2/1980 | Varga | 269/303 |
| 4,391,511 | 7/1983 | Akiyamma et al. | 355/40 |
| 4,494,895 | 2/1983 | Leaf | 408/236 |
| 4,534,093 | 8/1985 | Jahnke et al. | 29/26 |
| 4,561,642 | 12/1985 | Parque | 269/21 |

(List continued on next page.)

FOREIGN PATENT DOCUMENTS

| | | |
|---|---|---|
| 608407 | 5/1976 | Switzerland . |
| 890302 | 2/1962 | United Kingdom . |

*Primary Examiner*—William R. Briggs
*Attorney, Agent, or Firm*—Norman E. Brunell

[57] ABSTRACT

A vacuum vice for holding a bowling ball when drilling holes or engraving the ball includes inner and outer o-rings seals which form inner and outer concentric vacuum chambers that work together to form a seal with a bowling ball having surface imperfections or engraving. The inner vacuum chamber holds the ball against the inner seal and a vacuum passageway applies the vacuum to the outer vacuum chamber which seats the ball against the outer seal.

20 Claims, 4 Drawing Sheets

U.S. PATENT DOCUMENTS

| | | | |
|---|---|---|---|
| 4,582,460 | 4/1986 | Silverberg et al. | 409/175 |
| 4,684,113 | 8/1987 | Douglas et al. | 269/21 |
| 4,723,766 | 2/1988 | Beeding | 269/21 |
| 4,815,903 | 3/1989 | Skidmore, Sr. | 409/131 |
| 5,017,056 | 5/1991 | Morash | 408/1 R |
| 5,028,182 | 7/1991 | Park | 409/225 |
| 5,173,016 | 12/1992 | Ellison et al. | 409/132 |

VACUUM VICE FOR BOWLING BALLS

CROSS REFERENCE TO RELATED APPLICATIONS

This is a continuation-in-part application of U.S. patent application Ser. No. 08/213,884 filed Mar. 16, 1994, now abandoned.

BACKGROUND OF THE INVENTION

1. Field of the Invention

This invention relates to devices for holding bowling balls while finger holes and weighting holes are drilled in the ball. In particular, the present invention relates to vacuum chucks used to hold a bowling ball steady during drilling.

2. Description of the Prior Art

Common mechanical vices are awkward and difficult to use for holding heavy, round objects such as bowling balls, while drilling. An improvement over mechanical vices is the vacuum vice, shown for example, in U.S. Pat. No. 5,173,016. Such conventional vacuum vices typically include a vacuum chamber and a hard rim which makes a seal with the bowling ball. It is difficult to make a vacuum tight seal between the hard surface of the bowling ball and the hard rim, so additional sealing techniques, such as a movable, external soft sealing ring, have been used to reduce leakage. Such conventional vacuum vices are often complex and expensive. In addition, such vices are often not completely effective when there are imperfections in the surface of the bowling ball. For example, nicks or engraving in the ball break the seal between the ball and the prior art vacuum vice, thus reducing its ability to hold the ball effectively.

What is needed is a better vacuum vice for holding a bowling ball in an exact position for drilling and engraving.

SUMMARY OF THE INVENTION

In a first aspect, the present invention provides a vacuum vice for holding bowling balls including a housing for supporting a bowling ball, an inner seal on the housing surrounding and supporting a lower portion of the bowling ball to form an inner vacuum chamber between the lower portion of the bowling ball and the housing, an outer seal on the housing surrounding and supporting a second portion of the bowling ball including the first portion and an outer portion surrounding the first portion, the outer seal forming an outer vacuum chamber between the outer portion of the bowling ball and the housing, and a passageway for connecting a source of vacuum to the inner and outer vacuum chambers.

In another aspect, the present invention provides a method for holding bowling balls by mounting an inner seal on a housing supporting an inner portion of a bowling ball, forming an inner vacuum chamber between the housing and the inner portion of a bowling ball, mounting an outer seal on the housing surrounding a second portion of the bowling ball including the inner portion and an outer portion surrounding the inner portion, forming an outer vacuum chamber between the outer portion of the bowling ball and the housing, and applying a source of vacuum to the inner and outer vacuum chambers.

In still another aspect, the present invention provides a vacuum vice for holding bowling balls including a housing for supporting the bowling ball, inner and outer concentric circular seals on the housing for supporting the bowling ball and forming first and second concentric vacuum chambers between the bowling ball and the housing, and means for applying a source of vacuum to the first and second vacuum chambers. In addition, the housing may include a contoured surface between the inner and outer concentric circular seals which conforms to the surface of the bowing ball, a recess within the inner seal, and a passageway between the contoured surface and the recess.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE DRAWINGS

The vacuum vice of the present invention securely holds bowling balls of various sizes and weights during drilling and engraving even if the balls have surface imperfections such as nicks and engraving.

Figure 1:
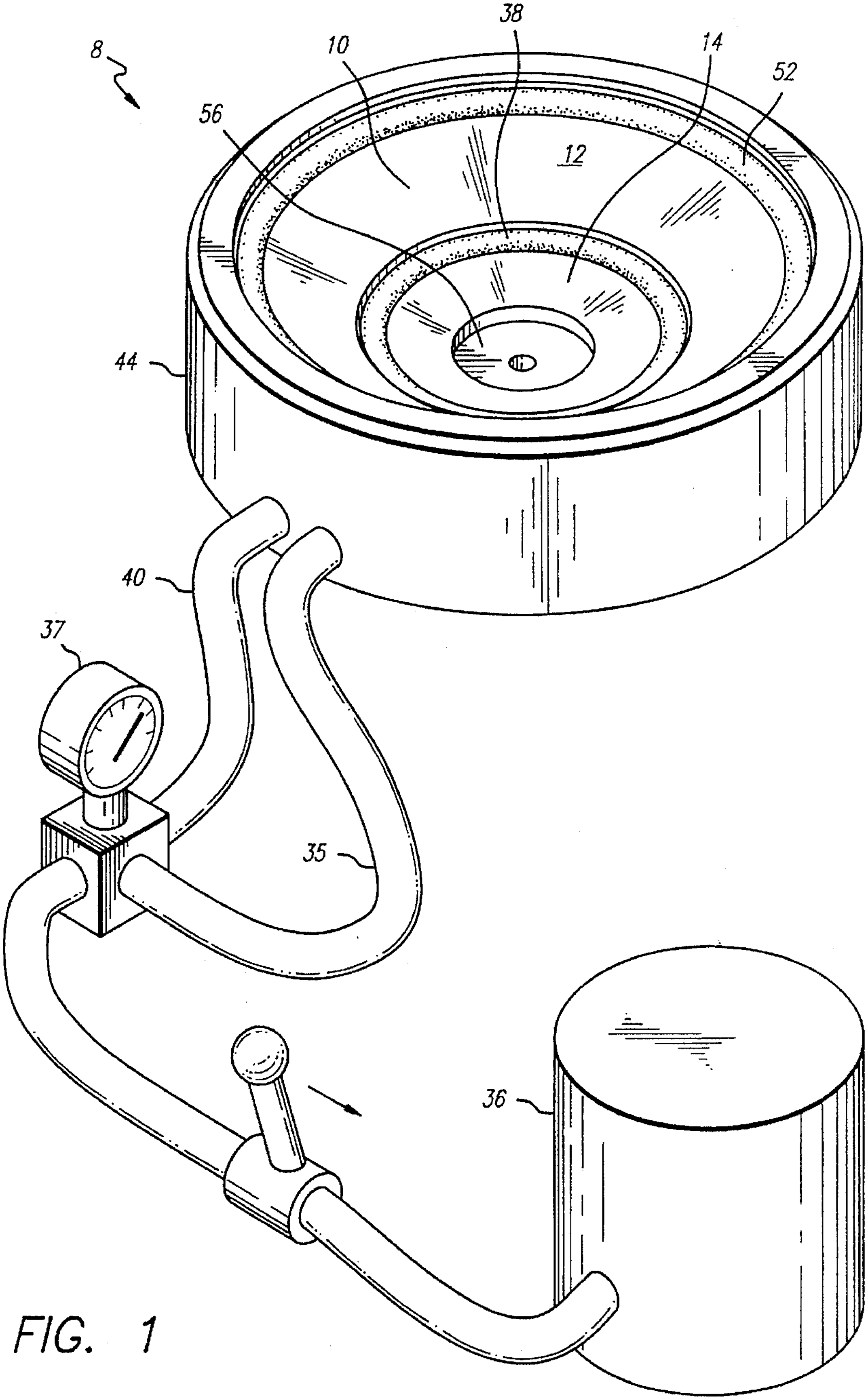
FIG. 1 is an isometric view of the vacuum vice of the present invention.
Figure 2:
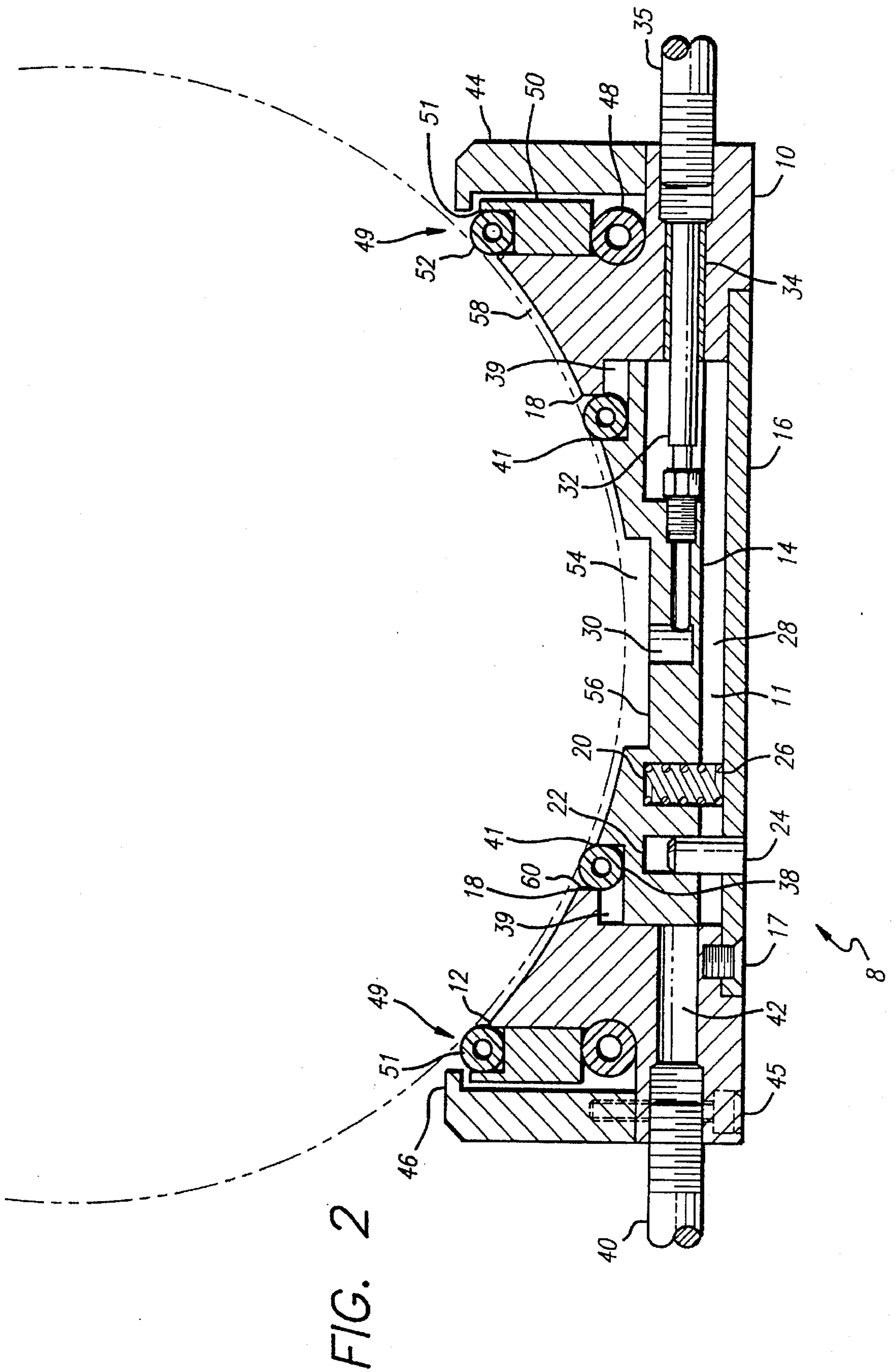
FIG. 2 is a cross sectional view of the vacuum vice shown in FIG. 1.

In accordance with a first embodiment shown in FIGS. 1 and 2, a buoyant cup with a soft compressible inner seal forms an inner vacuum chamber against the ball in the interior of the contoured hard rim surface on which the ball is seated. An outer vacuum chamber is formed which holds the ball against the hard rim and pulls against the buoyant cup, further urging the ball against the rim.

In accordance with the first embodiment, vacuum vice 8 of the present invention is shown in FIG. 1 and FIG. 2. Main body or housing 10 is made of a suitably hard substance, such as anodized aluminum, for supporting a bowling ball on hard rim surface 12. Hard rim surface 12 is contoured to fit the shape of the bowling ball while the bottom of housing 10 is generally flat, allowing it to be secured firmly to a flat mating surface on the milling or engraving machine with which it is to be used.

Buoyant cup 14 sits loosely in central cavity 11 of housing 10, at the interior of hard rim surface 12, forming the piston of piston chamber 28. Buoyant cup 14 is mounted for vertical motion within central cavity 11, but is constrained therein because the diameter of sealing surface 39 at the widest portion of buoyant cup 14 is greater than the diameter of inner lip 18 at the interior of hard rim surface 12. The top of buoyant cup 14 is generally concave to match the shape of a bowling ball and forms a generally continuous curve with the concave upper surface of hard rim surface 12 of housing 10. Buoyant cup 14 may conveniently be made of the same hard material as housing 10 and hard rim surface 12, such as anodized aluminum. The bottom of buoyant cup 14 is flat and contains spring receptacles 20 and dowel receptacles 22.

The generally flat bottom of housing 10 includes a recessed area in which bottom cover 16 is attached to form a smooth flat continuous bottom for vacuum vice 8. Bottom cover 16 is flat, contains dowels 24, and is attached to housing 10 with flathead screws 17 or similar attaching means.

When bottom cover 16 is placed under buoyant cup 14, dowels 24 are aligned and placed into dowel receptacles 22 of buoyant cup 14. Dowels 24 prevent buoyant cup 14 from rotating within the center of housing 10. Buoyant cup 14 sits on springs 26 which are placed in spring receptacles above bottom cover 16. A presently preferred embodiment includes three springs 26 and two dowels 24. The space between buoyant cup 14 and bottom cover 16 forms piston chamber 28 in the central cavity of housing 10. Buoyant cup 14 forms the piston in piston chamber Buoyant cup 14 also contains buoyant cup passageway leading from the top center of buoyant cup 14, half way down the center of buoyant cup 14, and then turning horizontal and exiting from the side of buoyant cup 14. In a presently preferred embodiment, the vertical portion of buoyant cup passageway 30 has about a one-quarter inch (¼") diameter, and the horizontal portion has about a one-eighth inch (⅛") diameter. Buoyant cup hose 32 is connected to buoyant cup passageway 30. Buoyant cup hose 32 extends through first housing passageway 34, a hole running horizontally through housing 10. First vacuum hose 35 connects buoyant cup hose 32 with vacuum source 36. In a presently preferred embodiment, first housing passageway 34 has a one-quarter inch (¼") diameter. As shown in FIG. 1, pressure gauge 37 may be attached between vacuum source 36 and vacuum vice 8.

Lower o-ring or inner seal 38 is located in the gap between the circumference of buoyant cup 14 and inner lip 18 at the interior of hard rim surface 12. In a presently preferred embodiment, inner seal 38 sits on flat, sealing surface extending from outer cup rim 41 at the outer circumference of buoyant cup 14. Inner seal 38 is made of a soft compressible material, such as hollow rubber or surgical tubing and, in a currently preferred embodiment, has an external diameter of about five-sixteenths of an inch (5/16") which substantially fills the space between outer cup rim 41 and inner lip 18 in which inner seal 38 is positioned. The width of sealing surface 39 is approximately twice the external diameter of inner seal 38 to maintain a good seal even when inner seal 38 is compressed.

Additionally, in a currently preferred embodiment, second vacuum hose 40 connects vacuum source 36 to second housing passageway 42, a hole through housing 10. In a currently preferred embodiment, second housing passageway 42 has a one-quarter inch (¼") diameter.

In addition to inner seal 38 provided at the interior of hard rim surface 12, outer seal 49 is provided in a space between the outer edge of hard rim surface 12 and outer housing 44 which is mounted to housing 10 by screws 45 or other securing means. Outer housing lip 46 of outer housing 44 restrains outer seal 49.

In a presently preferred embodiment, outer seal 49 includes inner o-ring 48, movable housing 50, and upper o-ring 52. Upper o-ring 52 and inner o-ring 48 may conveniently be made of hollow rubber tubing. Upper o-ring 52 has the same external and internal diameters as inner seal 38, and inner o-ring 48 has external and internal diameters fractions of an inch larger than the diameters of upper o-ring 52. More specifically, in a currently preferred embodiment, the external diameter of upper o-ring 52 is five-sixteenths of an inch (5/16"), and the external diameter of inner o-ring 48 is three-eighths of an inch (⅜").

In a presently preferred embodiment, movable housing 50 includes vertical riser 51 adjacent to outer housing 44. The height vertical riser 51 is about three-quarters (¾) of the external diameter of upper o-ring 52 which sits on an upper flat surface of movable housing 50. The space between outer housing lip 46 of outer housing 44 and the outer circumference of hard rim surface 12 is smaller than the diameter of upper o-ring 52 so that upper o-ring 52 can not accidently be pulled from vacuum vice 8. Outer housing lip 46 also retains movable housing 50 within vacuum vice 8.

In operation, a bowling ball placed into vacuum vice 8 compresses inner seal 38 to create inner vacuum chamber 54 between the ball and buoyant cup 14. Inner seal 38 is soft and compressible and allows for an increasingly wide area of contact with the bowling ball as inner seal 38 is compressed. The resulting seal is strong. Referring to FIG. 2, as contact between a bowling ball and inner seal 38 occurs, buoyant cup 14 is pushed down upon springs 26. Inner vacuum chamber 54 is created by switching on vacuum source 36 which must be capable of providing enough suction to hold the bowling ball so that it can be drilled. In a currently preferred embodiment, the amount of vacuum pressure applied is 27 psi. Under most conditions, the bowling ball is held against buoyant cup 14 by the vacuum in inner vacuum chamber 54 with sufficient force to permit drilling finger and/or weighting holes.

To enhance the holding characteristics of inner vacuum chamber 54, buoyant cup 14 may contain circular recession 56 in the center of its upper surface. In a presently preferred embodiment, circular recession 56 has a diameter about half the diameter of buoyant cup 14. More specifically, circular recession 56 is about one and one-half inches (1½") in diameter and about one-eighth inch (⅛") deep.

To further improve the holding capability of vacuum vice 8 to hold the ball against hard rim surface 12, outer seal 49 is used to both create an additional vacuum holding chamber and also to increase the force with which inner vacuum chamber 54 holds the ball against hard rim surface 12. As the bowling ball contacts inner seal 38 and pushes buoyant cup 14 down, the bowling ball simultaneously contacts and compresses outer seal 49 at the outer periphery of hard rim surface 12. In operation of outer seal 49, pressure exerted on upper o-ring 52 is transferred by movable housing 50 to inner o-ring 48. This compresses inner o-ring 48, and both movable housing 50 and upper o-ring 52 move down allowing vacuum vice 8 to adapt to differing ball sizes and weights.

Outer seal 49 forms outer vacuum chamber 58 between hard rim surface 12 and the ball which holds the ball against hard rim surface 12. Inner vacuum chamber 58 extends from the outer periphery of hard rim surface 12 to inner lip 18 at the inner periphery of hard rim surface 12 and is connected, by leakage path 60 at the outer edge of inner seal 38, to the central cavity of housing 10 which includes piston chamber 28. A vacuum is drawn by vacuum source 36 through second vacuum hose 40 into second housing passageway 42 which is directly connected to the central inner cavity of housing 10, including piston chamber Air in outer vacuum chamber 58, sealed at one end by outer seal 49, is drawn through leakage path 60 into central cavity 11 and evacuated therefrom through second housing passageway 42 and second vacuum hose 40 thereby drawing a vacuum in piston chamber 28 which is part of piston chamber As air is evacuated from piston chamber 28 buoyant cup 14 is drawn away from the bowling ball. The vacuum in inner vacuum chamber 54, between the ball and buoyant cup 14, serves to hold the ball against buoyant cup 14. The result of evacuating air from piston chamber 28 is therefore to draw buoyant cup 4 down as a piston and thereby draw the ball more tightly against hard rim surface 12, further compressing outer seal 49 which reduces any leakage by that seal.

It is important to note that there are two operable vacuum chambers possible with the present invention. The first vacuum chamber is inner vacuum chamber 54 which serves to hold buoyant cup 14 against the ball. The second vacuum chamber, connected to vacuum source 36 through a separate set of passageways, includes two subchambers, outer vacuum chamber 58 and piston chamber 28 which are connected to each other via leakage path 60. The vacuum in this second set of chambers serves, in outer vacuum chamber 58, to hold the ball against hard rim surface 12, and in piston chamber 28, to pull buoyant cup 14 and therefore the ball, harder against hard rim surface 12.

Figure 3:
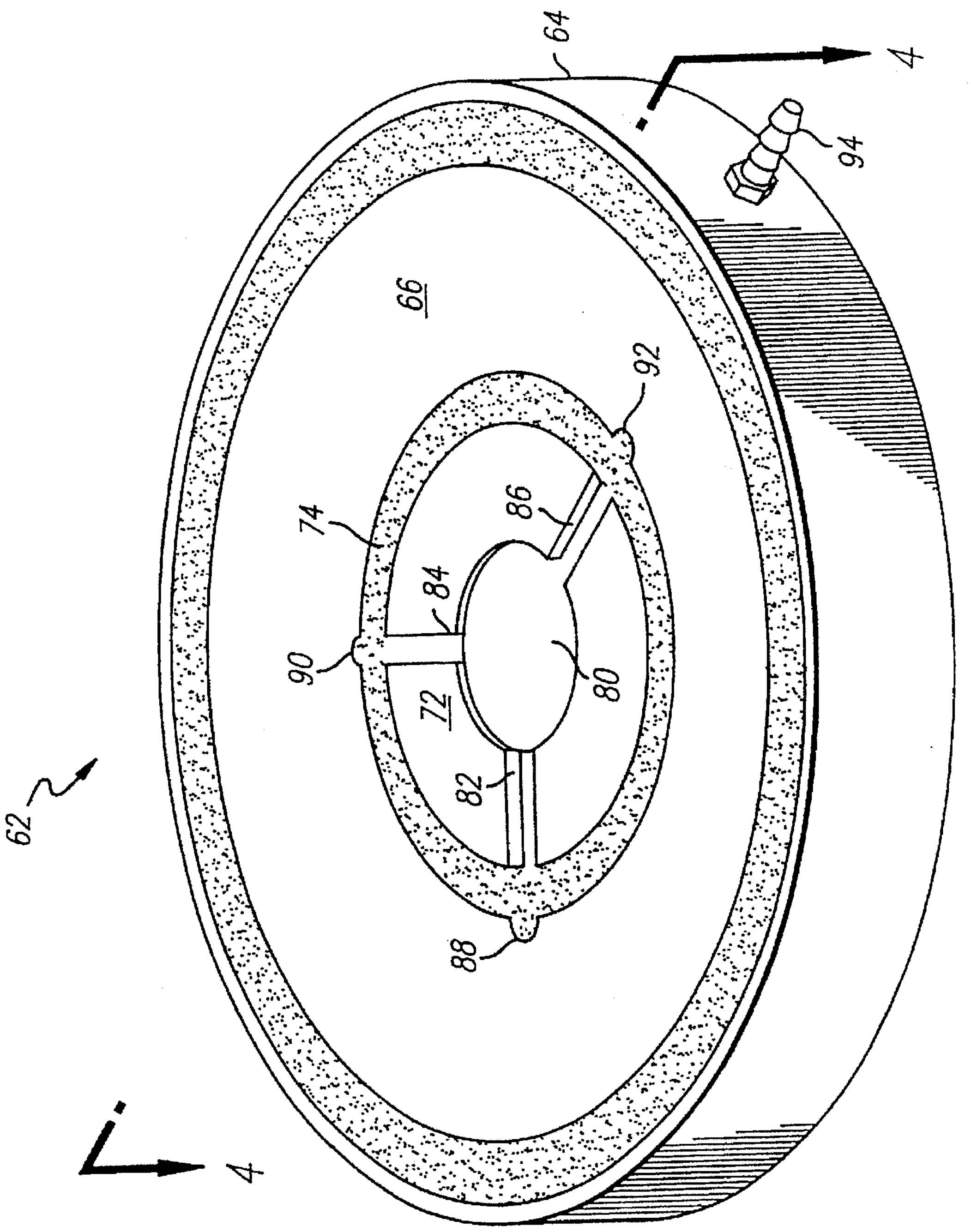
FIG. 3 is an isometric view of an enhanced vacuum vice according to the present invention.
Figure 4:
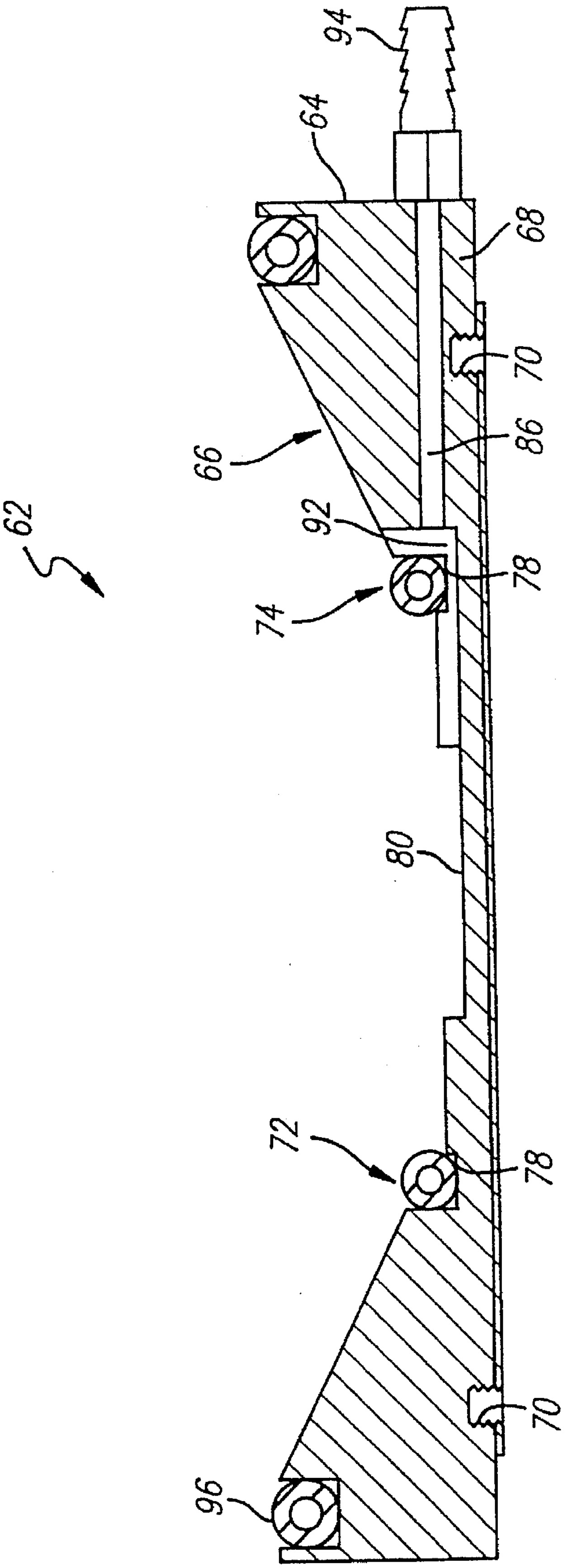
FIG. 4 is a cross sectional view of the vacuum vice shown in FIG. 3 taken along the line AA.

In accordance with a second embodiment of the present invention, shown in FIGS. 3 and 4, a rigid cup shaped recess surrounded by a soft compressible inner seal forms an inner vacuum chamber against the ball in the interior of the contoured surface on which the ball is seated. An outer vacuum chamber is formed with another compressible seal around the periphery of the contoured surface to further secure the ball.

In accordance with the second embodiment, vacuum vice 62 of the present invention is shown in FIGS. 3 and 4. Main body or housing 64 is made of a suitably hard substance, such as anodized aluminum, for supporting a bowling ball, housing 64 includes contoured surface 66 which is contoured to fit the shape of the bowling ball while bottom 68 of housing 64 is generally flat, allowing it to be secured firmly to a flat mating surface on a milling or engraving machine with which it is to be used. Housing bottom 68 is on the order of about 5 inches (127 cm) in diameter and includes a pair of threaded holes 70 spaced about 3.5 inches (89 cm) apart so that vacuum vice 62 may conveniently be mounted on a smaller drilling or engraving platform such as a simple drill press.

Rigid cup 72 is a cup shaped recess formed in housing 64 within the inner periphery of contoured surface 66 and surrounded by inner seal 74 positioned in peripheral groove 78 formed along the periphery thereof. Inner seal 74 is made of a soft compressible material, such as hollow rubber or surgical tubing and, in a currently preferred embodiment, has an external diameter on the order of about three-sixteenths of an inch (5.5 cm). The diameter of inner seal 74 is greater than the depth of peripheral groove 78 below contoured surface 66 so that the bowling ball contacts inner seal 74 first and must substantially compress inner seal 74 before the ball contacts contoured surface 66 if at all.

Inner cup 80 is formed at the center of rigid cup 72 and includes radial passageways 82, 84 and 86 which extend outward from the center of inner cup 80 slightly beyond inner seal 74 at the outer periphery of rigid cup 72 partially into ports 88, 90 and 92 in contoured surface 66. Additionally, radial passageway 86 extends past port 92 through housing 64 to connect with male hose connector 94 which may conveniently be connected to a suitable source of vacuum, as shown for example in FIG.1.

Outer support seal 96 is formed from the same material as inner seal 74 and mounted in a peripheral groove at the outer edge of contoured surface 66.

In operation, vacuum applied to hose connector 94 draws a vacuum through radial passageway 86 to form a vacuum within rigid cup 72 and inner cup 80 therein. By forming a vacuum within rigid cup 72, an inner vacuum chamber is formed between inner seal 74 and the portion of the bowling ball placed thereon and surrounded by inner seal 74. In addition, a vacuum applied to rigid cup 72 is applied through radial passageways 82, 84 and to ports 88, 90 and 92 in contoured surface 66 to form an additional outer vacuum chamber between contoured surface 66 and the portion of the bowling ball between inner seal 74 and outer support seal 96.

Both inner seal 74 and outer support seal 96 are made of soft compressible materials, such as rubber O-rings, and are partially compressed by the weight of a bowling ball positioned in vacuum vice 62. Before a vacuum is applied to rigid cup the full weight of the bowling ball is supported by seals 74 and 96. When vacuum is applied to form both inner and outer vacuum chambers, a substantial portion or all of the weight of the ball is still supported by the seals. Although good vacuum seals between the ball and seals 74 and 96 may be maintained even if the ball contacts and is partially supported by contoured surface 66, it is desirable in many applications to have the full weight of the ball supported by the seals.

Because the ball need not be supported by contoured surface 66, the shape of contoured surface 66 may be changed without departing from the spirit or scope of the present invention. In particular, as shown clearly in FIG. 4, the shape of contoured surface 66 may conveniently be made to conform to the outer surface of the bowling ball to minimize the volume of the outer vacuum chamber. If contoured surface 66 is not made to conform to the shape of the bowling ball, the outer vacuum chamber may be enlarged in effective size, requiring only that more air be removed in order to form a satisfactory vacuum.

Similarly, the surface of rigid cup 72 is shown in FIGS. 3 and 4 to not conform to the shape of the lower portion of the bowling ball so that, except for the support of inner seal 74 provided by peripheral groove 78, rigid cup 72 does not support the ball directly. The inner surface of rigid cup 72 may be contoured instead to conform to the lower portion of the bowling ball so that the volume of the inner vacuum chamber may also be minimized. This may increase manufacturing costs. Such costs are minimized in the design shown in FIGS. 3 and 4 in which the depth of rigid cup 72 is increased at its center by inner cup 80 so that the ball does not contact any portion of rigid cup 72.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A vacuum vice for holding bowling balls, comprising:

a housing for supporting a bowling ball;

an inner seal on the housing surrounding and supporting an inner portion of the bowling ball to form an inner vacuum chamber between the inner portion of the bowling ball and the housing;

an outer seal on the housing surrounding and supporting a second portion of the bowling ball including the inner portion and an outer portion surrounding the inner portion, the outer seal forming an outer vacuum chamber between the outer portion of the bowling ball and the housing; and a passageway for connecting a source of vacuum to the inner and outer vacuum chambers.

2. The invention of claim 1, wherein the housing further comprises:

a cup shaped recess for supporting the inner seal.

3. The invention of claim 2, wherein the cup shaped recess further comprises:

a peripheral groove at the outer periphery of the recess for supporting the inner seal.

4. The invention of claim 3, wherein the cup shaped recess further comprises:

a concentric, inner cup shaped recess within the cup shaped recess so that the bowling ball does not contact the housing within the inner seal.

5. The invention of claim 4, wherein the housing further comprises:

a contoured surface between the inner and outer seals to minimize the volume of the outer vacuum chamber.

6. The invention of claim 1, wherein the housing further comprises:

a contoured surface between the inner and outer seals to minimize the volume of the outer vacuum chamber.

7. The invention of claim 1, wherein the passageway further comprises:

a first passageway through the housing for applying the vacuum within the inner vacuum chamber; and a port between the first passageway and the outer vacuum chamber.

8. The invention of claim 7, wherein the passageway further comprises:

a second passageway communicating with the inner vacuum chamber; and a second port between the second passageway and the outer vacuum chamber.

9. The invention of claim 1, further comprising:

a contoured surface between the inner and outer seals to minimize the volume of the outer vacuum chamber;

a first passageway in the passageway for applying the vacuum within the inner vacuum chamber; and a port in the passageway between the first passageway and the outer vacuum chamber.

10. The invention of claim 1, wherein the inner and outer seals each further comprise:

a rubber O-ring.

11. A method of holding bowling balls, comprising the steps of:

mounting an inner seal on a housing supporting an inner portion of a bowling ball;

forming an inner vacuum chamber between the housing and the inner portion of a bowling ball;

mounting an outer seal on the housing surrounding a second portion of the bowling ball including the inner portion and an outer portion surrounding the inner portion;

forming an outer vacuum chamber between the outer portion of the bowling ball and the housing; and applying a source of vacuum to the inner and outer vacuum chambers.

12. The invention of claim 11, further comprising the step of:

forming a cup shaped recess in the housing for supporting the inner seal.

13. The invention of claim 12, further comprising the step of:

forming a peripheral groove at the outer periphery of the recess for supporting the inner seal.

14. The invention of claim 13, further comprising the step of:

forming a concentric, inner cup shaped recess within the cup shaped recess so that the bowling ball does not contact the housing within the inner seal.

15. The invention of claim 14, further comprising the step of:

forming a contoured surface between the inner and outer seals to minimize the volume of the outer vacuum chamber.

16. The invention of claim 11, further comprising the step of:

forming a contoured surface between the inner and outer seals to minimize the volume of the outer vacuum chamber.

17. The invention of claim 11, wherein the step of applying a source of vacuum to the inner and outer vacuum chambers further comprises the steps of:

applying the vacuum to the inner vacuum chamber through a first passageway; and applying the vacuum to outer vacuum chamber via a port in the first passageway.

18. The invention of claim 17, wherein the step of applying a the vacuum to the outer vacuum chamber further comprises the steps of:

applying the vacuum in the inner chamber to the outer chamber via a second port.

19. A vacuum vice for holding bowling balls, comprising:

a housing for supporting a bowling ball;

inner and outer concentric circular seals on the housing for supporting the bowling ball and forming first and second concentric vacuum chambers between the bowling ball and the housing; and means for applying a source of vacuum to the first and second vacuum chambers.

20. The invention of claim 19, wherein the housing further comprises:

a contoured surface between the inner and outer concentric circular seals, the surface conforming to the surface of the bowing ball;

a recess within the inner seal; and a passageway between the contoured surface and the recess.

* * * * *